US012668372B2

(12) United States Patent
Patel et al.

(10) Patent No.: US 12,668,372 B2
(45) Date of Patent: Jun. 30, 2026

(54) SYSTEMS, METHODS, AND APPARATUS FOR MONITORING LIFE VESTS ON AIRCRAFT

(71) Applicant: The Boeing Company, Arlington, VA (US)

(72) Inventors: Amar Patel, Arlington, VA (US); Vijay Rathore, Arlington, VA (US); Niraj Bhaktwarti, Arlington, VA (US); Sugavaneeshwar Shanmugam, Arlington, VA (US)

(73) Assignee: THE BOEING COMPANY, Arlington, VA (US)

( * ) Notice: Subject to any disclaimer, the term of this patent is extended or adjusted under 35 U.S.C. 154(b) by 3 days.

(21) Appl. No.: 18/488,515

(22) Filed: Oct. 17, 2023

(65) Prior Publication Data

US 2025/0121953 A1     Apr. 17, 2025

(51) Int. Cl.
B64D 45/00 (2006.01)
B64D 11/06 (2006.01)
G08B 7/06 (2006.01)

(52) U.S. Cl.
CPC .......... B64D 45/00 (2013.01); B64D 11/0631 (2014.12); *B64D 2045/007* (2013.01)

(58) Field of Classification Search
CPC ..................................................... B64D 45/00
See application file for complete search history.

(56) References Cited

U.S. PATENT DOCUMENTS

| | | | | |
|---|---|---|---|---|
| 6,246,863 B1* | 6/2001 | Kampel | .................. | G01S 13/88 |
| | | | | 455/100 |
| 10,748,413 B2 | 8/2020 | Martinez-Barreiro | | |
| 2007/0015422 A1* | 1/2007 | Everhart | ................ | B64D 11/06 |
| | | | | 441/80 |
| 2007/0229268 A1* | 10/2007 | Swan | ..................... | G08B 21/24 |
| | | | | 340/572.1 |
| 2007/0232164 A1* | 10/2007 | Swan | ................. | B64D 11/0631 |
| | | | | 441/108 |
| 2012/0203376 A1* | 8/2012 | Savage | ................ | G06Q 10/087 |
| | | | | 700/214 |
| 2016/0180664 A1* | 6/2016 | Carrender | .............. | G08B 13/12 |
| | | | | 340/539.1 |
| 2016/0275769 A1* | 9/2016 | Mcintosh | ........... | G08B 13/2414 |
| 2018/0229862 A1* | 8/2018 | Riera | ...................... | H04B 5/77 |
| 2020/0070772 A1 | 3/2020 | Kim et al. | | |

(Continued)

OTHER PUBLICATIONS

EP Search Report mailed Oct. 21, 2024 in re EP Application No. 24193315.9.

*Primary Examiner* — Davetta W Goins
*Assistant Examiner* — Pameshanand Mahase
(74) *Attorney, Agent, or Firm* — COATS & BENNETT, PLLC

(57) ABSTRACT

A system for monitoring a presence of a life vest on an aircraft is disclosed. The system may comprise a sensor configured to output a first signal when the sensor detects the life vest and to output a second signal when the sensor fails to detect the life vest. The system may also comprise a first visual indicator in communication with the sensor. The first visual indicator may be activated based on the first signal. Further, the system may also comprise a second visual indicator in communication with the sensor. The second visual indication may be activated based on the second signal.

20 Claims, 7 Drawing Sheets

(56)           References Cited

U.S. PATENT DOCUMENTS

| | | | |
|---|---|---|---|
| 2021/0107659 A1* | 4/2021 | Steinmeyer | ........ G08B 13/1481 |
| 2021/0221517 A1 | 7/2021 | Guy | |
| 2023/0081750 A1* | 3/2023 | Zachäus | ............ B64D 45/0015 |
| | | | 324/133 |

* cited by examiner

Figure 8:
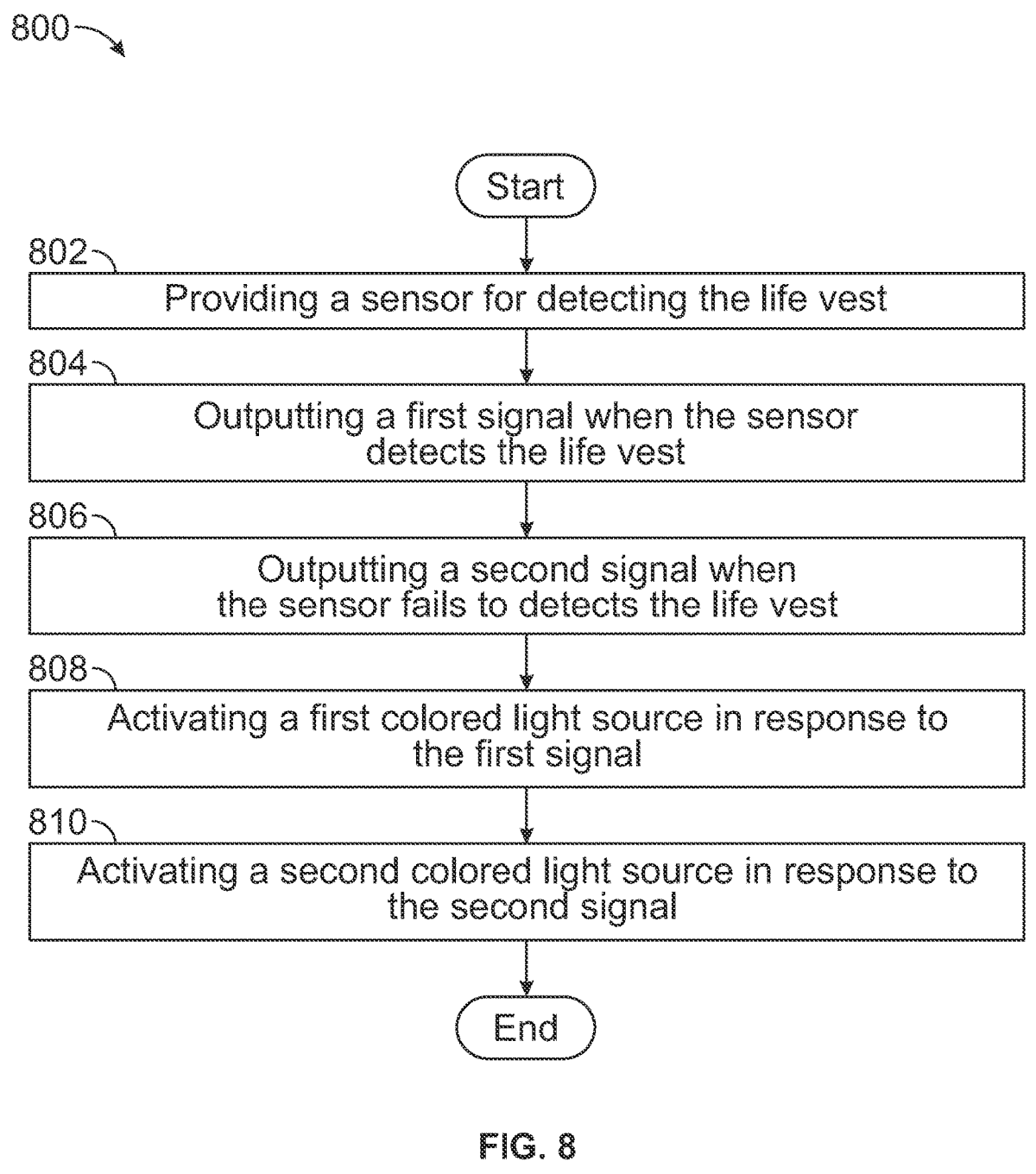

800

```
                          ┌─────────┐
                          │  Start  │
                          └─────────┘
                               │
                               ▼
802 ┌────────────────────────────────────────────────────────┐
    │          Providing a sensor for detecting the life vest  │
    └────────────────────────────────────────────────────────┘
                               │
                               ▼
804 ┌────────────────────────────────────────────────────────┐
    │         Outputting a first signal when the sensor        │
    │                  detects the life vest                   │
    └────────────────────────────────────────────────────────┘
                               │
                               ▼
806 ┌────────────────────────────────────────────────────────┐
    │             Outputting a second signal when              │
    │        the sensor fails to detects the life vest         │
    └────────────────────────────────────────────────────────┘
                               │
                               ▼
808 ┌────────────────────────────────────────────────────────┐
    │     Activating a first colored light source in response to │
    │                    the first signal                     │
    └────────────────────────────────────────────────────────┘
                               │
                               ▼
810 ┌────────────────────────────────────────────────────────┐
    │   Activating a second colored light source in response to │
    │                   the second signal                     │
    └────────────────────────────────────────────────────────┘
                               │
                               ▼
                          ┌─────────┐
                          │   End   │
                          └─────────┘
```

SYSTEMS, METHODS, AND APPARATUS FOR MONITORING LIFE VESTS ON AIRCRAFT

FIELD

The present disclosure relates generally to monitoring systems and, more particularly, to systems that can be used to monitor or detect the presence of articles or objects, such as life vests, stored on an aircraft.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Airlines typically face strict safety regulations concerning the installation, maintenance, and operation of certain safety equipment on-board aircraft. For example, commercial aircraft are commonly equipped with flotation devices or life vests for use by passengers in the event of a water landing. The safety regulations generally require that life vests be stored within easy reach of each seated occupant and readily be removable from the aircraft. This requirement is typically satisfied by stowing a life vest near each passenger seat in a specifically designated area. For example, a life vest may be installed under each passenger seat of an aircraft to ensure there is at least one life vest for each passenger on-board. When the life vests are stored under the passenger seats, the life vests may be disposed within stowage containers.

To ensure that an aircraft is in compliance with safety regulations, a great deal of time and effort may be spent on inspecting life vests stored on the aircraft prior to flight. Currently, inspections of life vests may be manually performed by airline crew members. For example, airline crew members may verify the presence of life vests in various designated areas. Specifically, the crew members may perform visual inspections to confirm that a life vest is stowed under each passenger seat and has not been tampered with or otherwise removed.

Further, airline crew members may be required to access and visually inspect various features of the life vests. For example, each life vest may need to be removed to check or verify the expiration date and other information associated with the life vest. These manual inspections may be time consuming, labor intensive, and costly to airline operations especially in modern aircraft designed to fly many passengers. In addition, performing such inspections can cause the aircraft to stand by on the ground until the inspections are complete. These manual and visual inspections may also be prone to human errors. For example, a crew member may miss one or more designated areas or mistakenly identify the presence of a life vest.

An alternative to manual/visual safety inspections may involve equipping life vests and other safety devices with electronic devices, such as radio frequency identification (RFID). For instance, a traditional RFID reader may be able to scan many RFID tags associated with life vests. However, confirmation that all RFID tags are readable inside the aircraft cabin may not be sufficient for verifying the presence of a life vest at a designation storage location. For example, receiving a response signal from a RFID tag does not confirm that the tag is attached to the life vest. In some instances, an RFID tag can be separated from a life vest and the life vest can be removed from the aircraft. Further, a life vest with a RFID tag can be placed in a non-designated area (e.g., misplaced). Therefore, implementations of traditional RFID systems in unique environments of aircraft cabins have been limited and manual safety inspections of the life vests may be required.

For at least these reasons, it would be advantageous to develop systems and methods to reduce the amount of time and expense of safety inspections involving life vests and to prevent life vests from being removed and/or stolen.

SUMMARY

The present application is directed to embodiments that relate to systems, methods, and apparatus for detecting or monitoring the presence of objects or articles, such as life vests. The embodiments can automatically and continuously monitor or detect the presence of the life vests stored on a vehicle, such as an aircraft. The embodiments can ensure compliance with airline safety regulations by providing verification that the life vests are present in designated locations.

The embodiments can reduce the number of manual inspections involving life vests, decrease labor costs of the inspections, and reduce the time to complete the inspections. Further, the embodiments may reduce the potential for human error associated with manual inspections of life vests. For example, the embodiments can be configured to detect whether a life vest is present under a passenger seat or in an overhead storage compartment. In addition, in the aircraft industry, the embodiments may reduce the number of flights that are delayed for inspections involving life vests.

The embodiments may be configured to provide a visual indication when a life vest is in its properly stowed location. The embodiments may also provide a visual indication and/or audio alert when a life vest is not present or detected in its designated location (e.g., the life vest has been removed, stolen, misplaced, or tampered with). For example, the embodiments may provide a notification or an alarm to alert crew members (e.g., flight attendants) when a life vest is no longer detected. Such notification and alerts may prompt the crew members to verify the presence of a life vest and/or assist in making sure that the life vest is replaced or stowed in its proper location. The notifications and alerts may also prevent life vests from being removed, misplaced, and/or stolen, thereby reducing costs and the amount of inventory needed for replacing the life vests. Further, the embodiments may be configured to notify personnel that a life vest has expired or is about to expire.

In one aspect, a system for monitoring a presence of a life vest on an aircraft is disclosed. The system may comprise a sensor configured to output a first signal when the sensor detects the life vest and to output a second signal when the sensor fails to detect the life vest. The system may also comprise a first visual indicator in communication with the sensor. The first visual indicator may be activated based on the first signal. Further, the system may also comprise a second visual indicator in communication with the sensor. The second visual indication may be activated based on the second signal.

In another aspect, a method for monitoring a life vest of an aircraft is disclosed. The method may include providing a sensor for detecting the life vest. The method may also include outputting a first signal when the sensor detects the life vest and outputting a second signal when the sensor fails to detect the life vest. Further, the method may include activating a first colored light source in response to the first signal and activating a second colored light source in response to the second signal.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 8 is a flow chart of a method for detecting or monitoring the presence of a life vest in a passenger cabin of an aircraft, in accordance with an exemplary embodiment.

DETAILED DESCRIPTION

Figure 1:
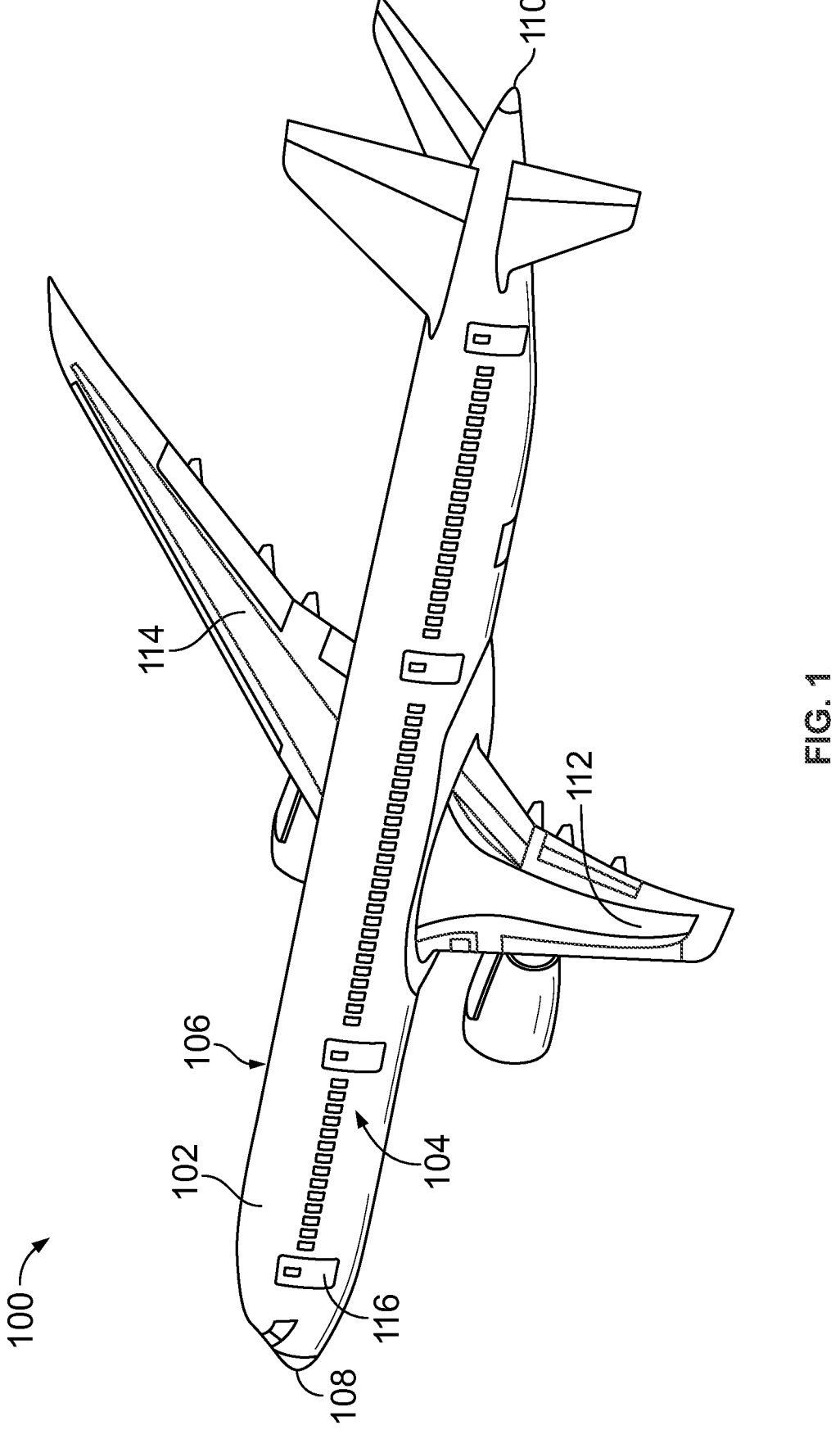
FIG. 1 illustrates an example aircraft in which embodiments for detecting or monitoring the presence of life vests may be implemented.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular embodiments are described herein with reference to the drawings. In the description, common features are designated by common reference numbers throughout the drawings. In some drawings, multiple instances of a particular type of feature may be used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, console units are illustrated and associated with reference number 214. When referring to a particular one of the console units, such as the console unit 214A, the distinguishing letter "A" may be used. However, when referring to any arbitrary one of the console units or to the console units as a group, the reference number 214 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present application is directed to embodiments that relate to systems, methods, and apparatus for detecting or monitoring the presence of objects or articles, such as life vests. The embodiments can automatically and continuously monitor or detect the presence of the life vests stored on a vehicle, such as an aircraft. The embodiments can ensure compliance with airline safety regulations by providing verification that the life vests are present in designated locations.

The embodiments can reduce the number of manual inspections involving life vests, decrease labor costs of the inspections, and reduce the time to complete the inspections. Further, the embodiments may reduce the potential for human error associated with manual inspections involving life vests. For example, the embodiments can be configured to detect whether a life vest is present under a passenger seat or in an overhead storage compartment. In addition, in the aircraft industry, the embodiments may reduce the number of flights that are delayed for inspections involving life vests.

The embodiments may be configured to provide a visual indication when the life vest is in its properly stowed location. The embodiments may also provide a visual indication and/or audio alert when a life vest is not present or detected in its designated location (e.g., the life vest has been removed, stolen, misplaced, or tampered with). For example, the embodiments may provide a notification or an alarm to alert crew members (e.g., flight attendants) when a life vest is no longer detected. Such notification and alerts may prompt the crew members to verify the presence of a life vest and/or assist in making sure that the life vest is replaced or stowed in its proper location. The notifications and alerts may also prevent life vests from being removed, misplaced, and/or stolen, thereby reducing costs and the amount of inventory needed for replacing the life vests. Further, the embodiments may be configured to notify crew members that a life vest has expired or is about to expire.

Referring now to the drawings, and more particularly to FIG. 1, an example aircraft 100 is illustrated in which systems, methods, and apparatus disclosed herein can be implemented. The aircraft 100 of FIG. 1 includes a fuselage 102 having a left side 104, a right side 106, a nose end 108, and a tail end 110. A first wing 112 is coupled to the left side 104 of the fuselage 102. A second wing 114 is coupled to the right side 106 of the fuselage 102. In the illustrated example, the aircraft 100 includes a door 116 disposed on the left side 104 of the fuselage 102. Passengers and/or crew may enter (e.g., board) and/or exit (e.g., disembark) the aircraft 100 via the door 116. The aircraft 100 of FIG. 1 is merely an example and, thus, other aircrafts may be used without departing from the scope of this disclosure. Further, it is contemplated that the systems, methods and apparatus disclosed herein may be used in other vehicles, such as boats, busses, and trains.

Figure 2:
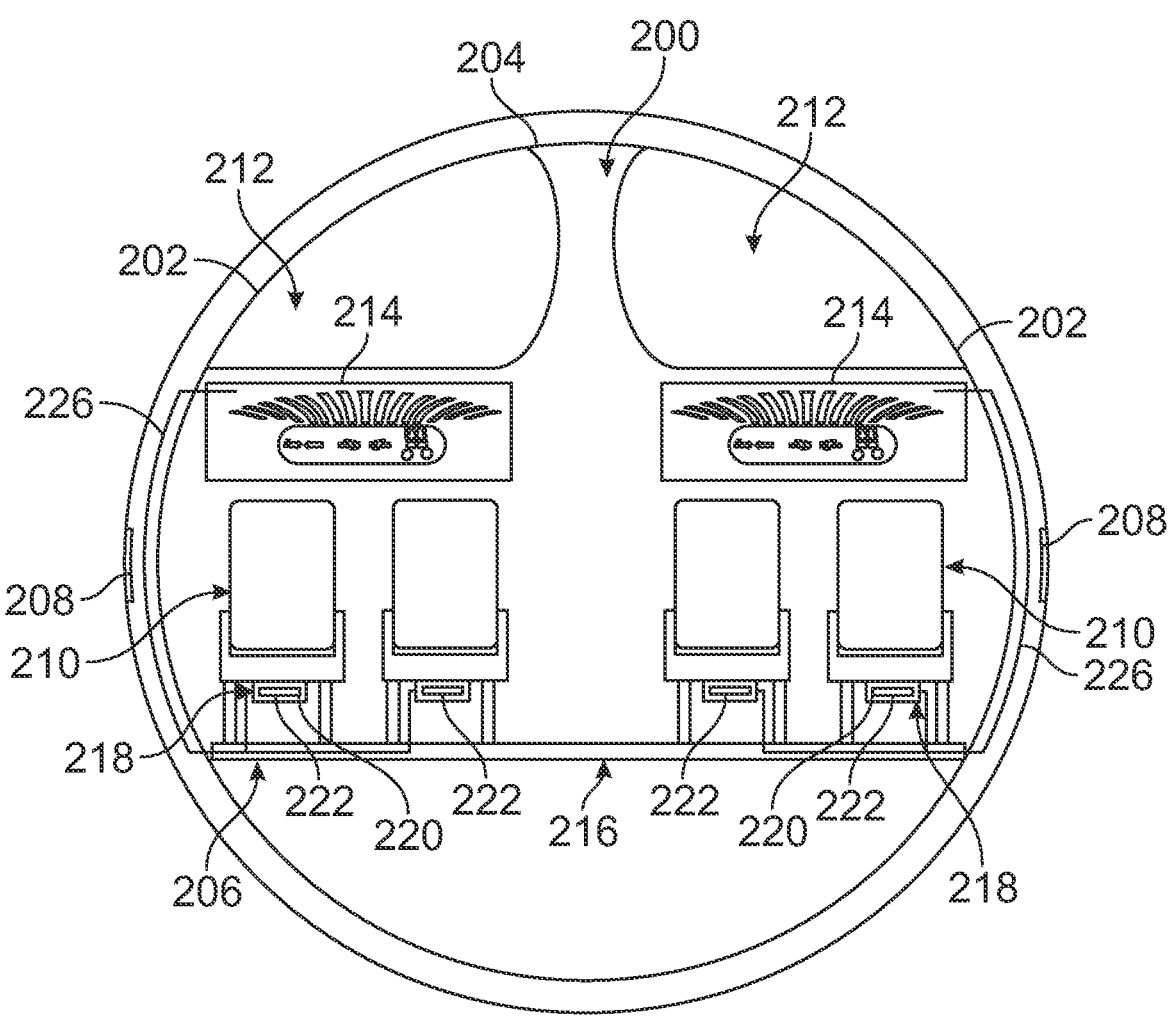
FIG. 2 is a front view of a section of a passenger cabin of the aircraft shown in FIG. 1, in accordance with an exemplary embodiment.

FIG. 2 illustrates a front view of a passenger cabin 200 of an aircraft, such as the aircraft 100 shown in FIG. 1. The passenger cabin 200 may include walls 202, a ceiling 204, a floor 206, windows 208, passenger seats 210, overhead stowage bins 212, and console units 214. The walls 202 of the passenger cabin 200 may be connected to the ceiling 204 and the windows 208 may be formed within the walls 202. The overhead stowage bins 212 may be secured to the ceiling 204 and/or the walls 202 of the passenger cabin 200 on either side of an aisle 216. The overhead stowage bins 212 may extend between the front and rear end of the passenger cabin 200 and may be positioned over the passenger seats 210. The overhead stowage bins 212 may be configured to pivotally open in order to accept passenger carry-on luggage or other items.

As shown in FIG. 2, the floor 206 of the passenger cabin 200 may support the passenger seats 210. The passenger cabin 200 may include multiple rows of passenger seats 210. In the illustrated example, each row of the passenger seats 210 may include two seats on either side of the aisle 216. In other examples, each row may include more or less passenger seats than shown. Additionally, the passenger cabin 200 may include more aisles than shown. The console units 214 may be positioned over the passenger seats 210 within a row.

Each of the passenger seats 210 may have a stowage container 218 attached to the bottom or underside of the passenger seats 210. The stowage container 218 may include a housing or frame 220 that at least partially defines an internal stowage area or stowage compartment. Each stowage container 218 can be used to stow a life vest 222. The stowage container 218 may also store other safety equipment, such as medical equipment, food items, and the like. The stowage container 218 can readily be accessed by the occupant of the passenger seat 210 to access the life vest 222 during an emergency. Further, the stowage container 218 can be configured to attach to seats in other vehicles, such as ships, boats, or trains, where securing safety equipment, such as life vests, against tampering and removal is desired.

Figure 3:
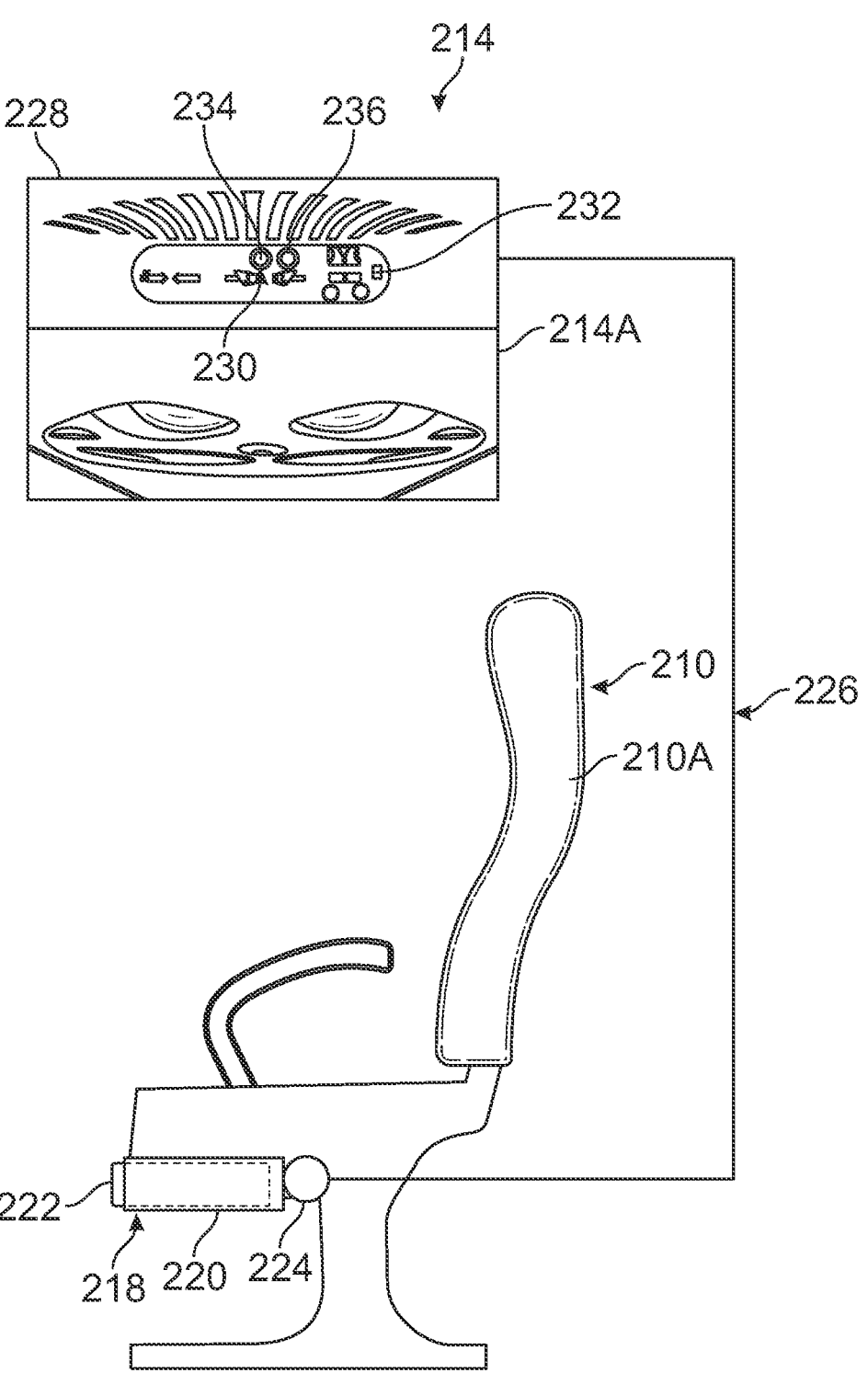
FIG. 3 is a side view of a passenger seat of the passenger cabin shown in FIG. 2, equipped with a system for monitoring the presence of a life vest underneath the seat, in accordance with an exemplary embodiment.

As shown in FIG. 3, a sensor 224 may be configured to detect or monitor the presence or status of the life vest 222 in the stowage container 218. The sensor 224 may be configured to output one or more signals to the console unit 214A by one or more wires 226. In some examples, a wireless communication module (not shown) may wirelessly communicate or transmit the signals to the console unit 214A. The specific placement of the sensor 224 on or near the stowage container 218 may vary depending on the configuration of the stowage container 218 so long as the sensor 224 can detect or sense the presence of the life vest 222 disposed in the stowage container 218. The sensor 224 may be any suitable type of sensor. For example, the sensor 224 may include a magnetic sensor, a pressure sensor, a limit switch sensor, a capacitive sensor, an eddy-current sensor, an inductive sensor, an optical sensor, or another suitable sensor.

The sensor 224 may be configured to output a first signal when the sensor 224 detects the presence of the life vest 222 and may output a second signal when the sensor 224 fails to detect the life vest 222. The sensor 224 may have a switch configured to be moveable between a first position or state and a second position or state. The switch may be in the first position when the sensor 224 detects the presence of the life vest 222. In the first position, the sensor 224 may enable a voltage to be applied to a first circuit path. Upon the removal of or tampering with the life vest 222, the sensor 224 may fail to detect the presence of the life vest 222 and the switch may move from the first position to the second position. In the second position, the sensor 224 may enable a voltage to be applied to a second circuit path as further described below.

The sensor 224 may include an actuator configured to actuate a switch of the sensor 224. The actuator may have a depressed position and an extended position. When a life vest 222 contacts or engages the actuator, the actuator may be in the depressed position to cause the switch of the sensor 224 to move to a first position or state and apply voltage to a first circuit path. When the life vest 222 is separated from the sensor 224, the actuator will extend into a non-depressed position and cause the switch of the sensor 224 to move to a second position or state and apply a voltage to a second circuit path.

In some examples, the sensor 224 may be a proximity sensor. The proximity sensor may be placed within a predetermined distance from the life vest 222. The proximity sensor may be used to determine whether the life vest 222 has been separated or moved away from the sensor 224. For example, the sensor 224 may output a first signal to indicate that the life vest is in sufficiently close proximity with the sensor 224. When the life vest 222 is moved away from the proximity sensor by a predetermined distance, the sensor 224 may not or fail to detect the presence of the life vest and output a second signal to indicate that the life vest 222 has been removed or tampered with. In some examples, the proximity sensor may be configured to detect a tag or element (e.g., a magnet) attached to a life vest 222. The tag or element may be passive and may not require its own power source.

As shown in FIG. 3, the console unit 214A may receive or detect signals from the sensor 224 through the one or more wires 226. The console unit 214A may include a housing 228 that generally contains one or more indicators 230 and/or a visual or audio alarm 232. The indicators 230 may provide a real time visible indication of the presence or status of the life vest 222 disposed underneath the passenger seat 210A. The indicators 230 may be visible from an aisle or within a row of passenger seats 210. The audio alarm 232 of the console unit 214A may be deactivated by a switching device (not shown). The console unit 214A may also include vents, reading lights, an oxygen bag drop panel, an attendant request button, and/or other suitable controls for the occupant of the passenger seat to utilize.

The indicators 230 of the console unit 214A may be configured to indicate whether the life vest 222 is detected (e.g., because the life vest is properly stowed) or not detected (e.g., because the life vest 222 has been stolen, misplaced, tampered with, removed, or is improperly stowed). The indicators 230 may also indicate whether the life vest is expired. As shown in FIG. 3, the indicators 230 of the console unit 214A may include at least a first indicator 234 and a second indicator 236. The first indicator 234 may be configured to indicate that the life vest 222 disposed underneath the passenger seat 210A is present, properly stowed, and is not expired. The first indicator 234 may comprise a light source indicator (e.g., a light emitting diode (LED)) that may be illuminated with a distinct color. For example, the first indicator 234 may display a green color.

The second indicator 236 of the console unit 214A may be configured to indicate that that life vest disposed underneath the passenger seat 210A has been tampered with, removed, and/or is expired. The second indicator 236 may comprise a light source indicator (e.g., an LED) that may be illuminated with a distinct color. For example, the second indicator 236 may display a red color. In some examples, the second indicator 236 may display a yellow color when the life vest 222 is properly stowed but is about to expire. Therefore, the second indicator 236 may alert crew members that the life vest 222 should be inspected and/or replaced. Further, the second indicator 236 can alert crew members to investigate when a life vest 222 is tampered with or removed from its stowage location by a passenger, preventing theft and/or making sure the life vest 222 is properly stowed or replaced.

In some examples, the console unit 214A may include a single light source indicator (e.g., an LED) configured to display multiple colors. For example, the light source indicator may display a first color (e.g., green) for indicating that the life vest 222 disposed underneath the passenger seat 210A is properly stowed and is not expired. The light source indicator may display a second color (e.g., red) for indicating that that life vest displayed underneath the passenger seat 210A has been removed, tampered with, and/or is expired. In some examples, the light source indicator may display a third color (e.g., yellow) when the life vest is about to expire.

Figure 4:
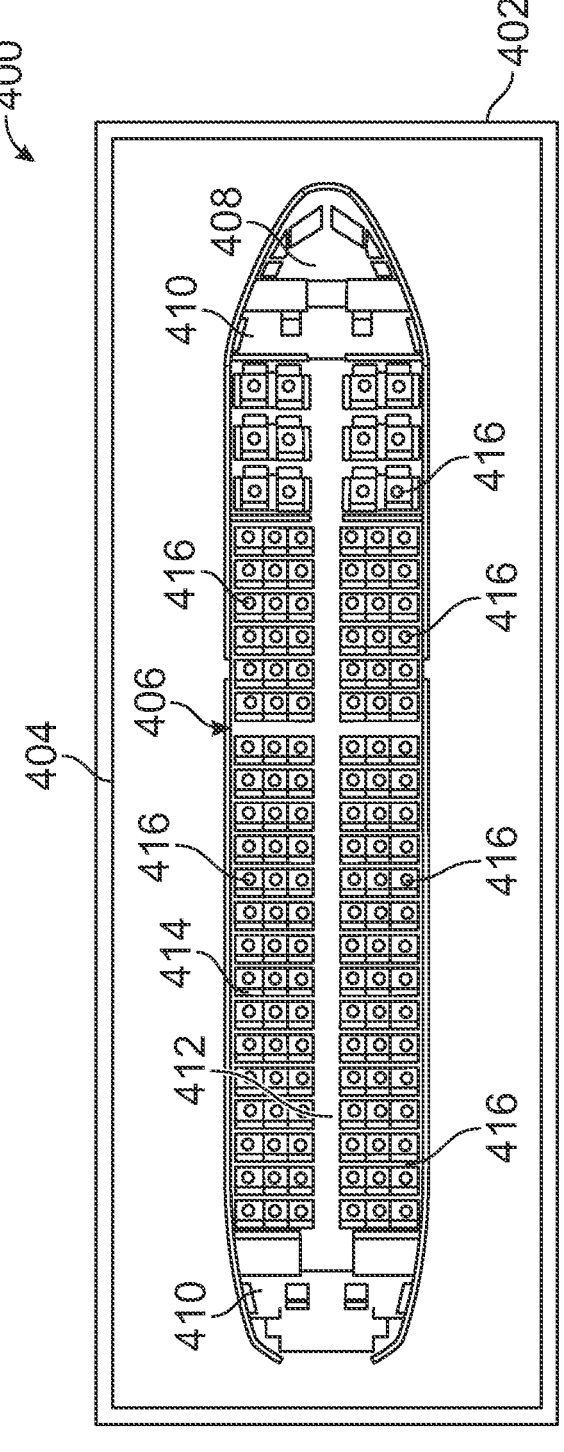
FIG. 4 is a representation of a passenger cabin presented by a graphical user interface of a monitoring unit, according to an exemplary embodiment.

Referring now to FIG. 4, a schematic representation of a monitoring unit or inspection system 400 for detecting and/or monitoring the presence of life vests in a passenger cabin of an aircraft is shown, according to an exemplary embodiment. The monitoring unit 400 may be located in a crew area and/or a flight deck of the aircraft. The monitoring unit 400 may receive inputs from sensors or electric circuits that detect the presence of life vests disposed underneath each seat in the passenger cabin of an aircraft. The monitoring unit 400 may also generate reports about compliance with safety regulations involving life vests. The report may include a list of all life vests detected underneath each passenger seat (e.g., a life vest is present and properly stowed) and a list of the life vest not detected (e.g., the life vest has been stolen, misplaced, tampered with, removed, or is improperly stowed).

As shown in FIG. 4, the monitoring unit 400 may include a display 402 presenting a graphic user interface (GUI) 404 configured to depict a representation of the cabin 406 of the aircraft. The GUI 404 may depict the flight deck 408, the crew areas 410, and the passenger compartment 412 of the aircraft. As shown, the representation of the passenger compartment 412 displayed on the GUI may include a representation of the passenger seating 414 in the cabin 406, which includes a visual or graphical indicator 416 associated with the life vests for each passenger seat. The GUI 404 may display a stowed status, an expiration status, and a tamper status for each life vest disposed underneath the passenger seats in the cabin 406.

The GUI 404 of the monitoring unit 400 can enable crew members (e.g., flight attendants, etc.) to continuously monitor the presence or status of the life vests in the cabin 406 from a single location without having to enter through the passenger compartment 412 to visually inspect the life vests. Further, the GUI 404 can enable crew members to quickly identify whether the life vests are properly stored underneath each of the passenger seats. For example, the visual indicators 416 displayed on the GUI 404 may indicate which life vests are detected underneath each passenger seat (e.g., a life vest is present and properly stowed) or is not detected (e.g., the life vest has been stolen, misplaced, tampered with, removed, or is improperly stowed). In addition, the crew members may perform an inspection of the life vests disposed under the passenger seats in the cabin 406 by viewing the visual indicators 416 displayed on the GUI 404 to verify and confirm the presence or status of the life vests.

The GUI 404 of the monitoring unit 400 may also display a visual or graphical indicator indicating that the life vest has expired and needs to be replaced. When the visual indicator on the GUI 404 shows that one or more life vests has expired, crew members may then replace the life vests. The GUI 404 may also display a visual or graphical indicator indicating that the life vest will expire soon. In some examples, the GUI 404 may display the visual indicators in a list or table with other information about each life vest. For example, tables may include seat numbers and stowed statuses, expiration dates, expiration statuses, and/or tamper statuses.

Further, the monitoring unit 400 may provide an alarm or notifications in real-time when a life vest has been tampered with or removed from underneath a passenger seat. Such alarms and notifications may prompt crew members (e.g., flight attendants) to investigate and perform an inspection when a life vest has been tampered with or removed from its designation storage location by a passenger, preventing theft and/or to assist to in making sure that the life vest is returned to its properly stowed position or replaced. The monitoring unit 400 may record the time when a life vest is removed and from which seat. If the life vest is not replaced, the airline may charge the passenger sitting in that seat for the missing life vest or initiate an investigation. Further, when a life vest expires, the monitoring unit 400 may issue an audio alert or other notice so that a crew member can replace the life vest immediately. The alarms may be silenced or overridden in the event of an emergency. For example, the alarms may be deactivated by a switching device (not shown).

Figure 5:
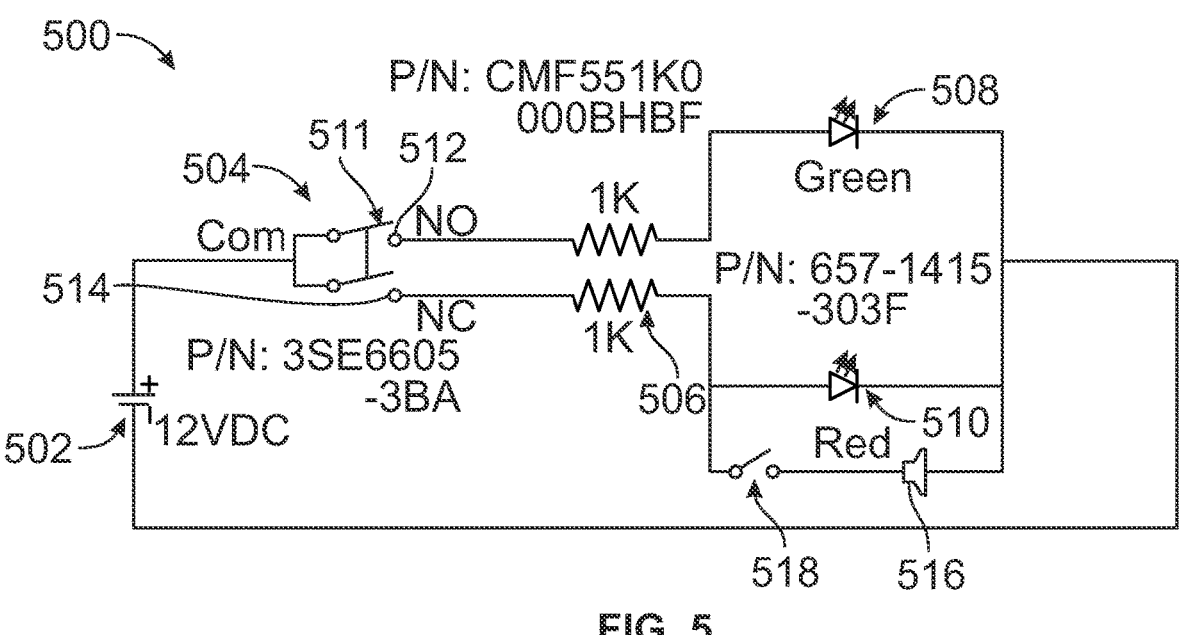
FIG. 5 is a schematic diagram of an electric circuit for detecting or monitoring the presence of a life vest, according to an exemplary embodiment.
Figure 6:
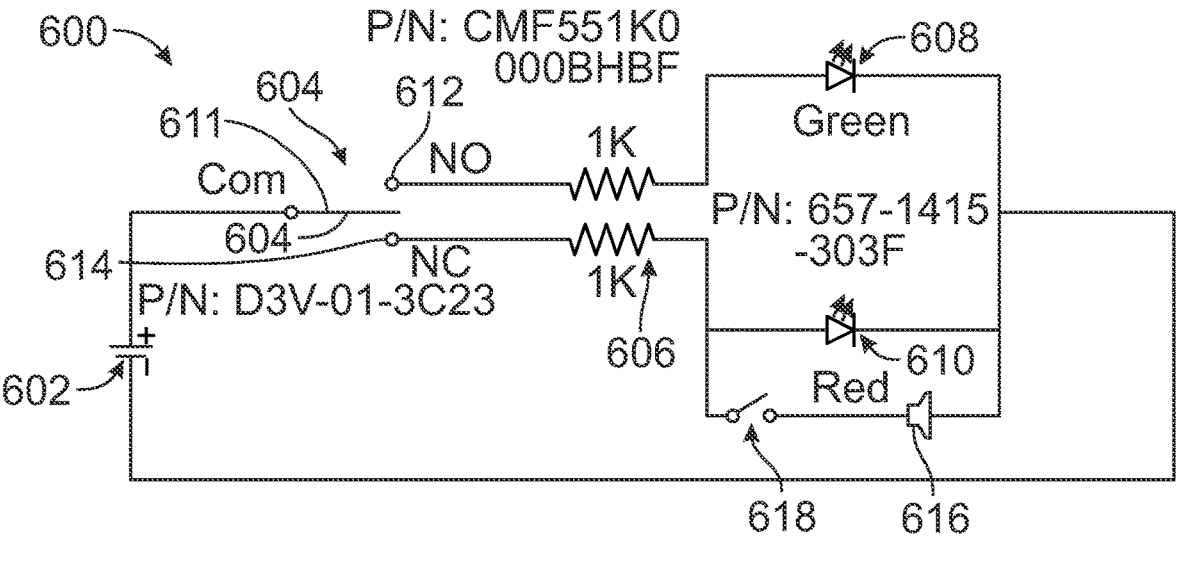
FIG. 6 is a schematic diagram of an electric circuit for detecting or monitoring the presence of a life vest, according to another exemplary embodiment.
Figure 7:
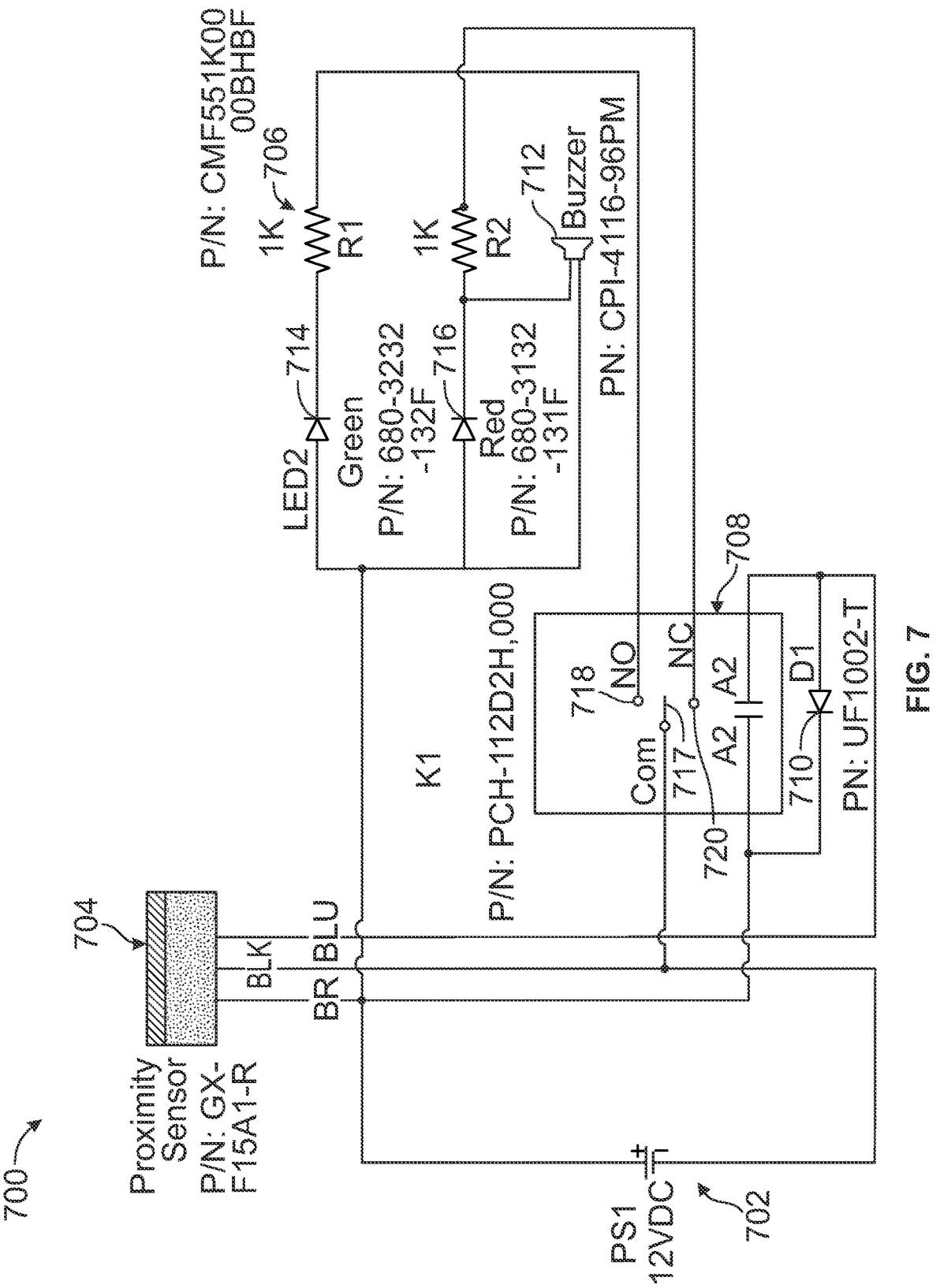
FIG. 7 is a schematic diagram of an electric circuit for detecting or monitoring the presence of a life vest, according to another exemplary embodiment.

Referring now to FIGS. 5-7, schematic diagrams of electric circuits for detecting or monitoring the presence or status of an article or item, such as a life vest, are shown, according to exemplary embodiments. FIG. 5 shows a schematic diagram of the electrical circuit 500 for detecting or monitoring the presence of a life jacket disposed underneath a passenger seat of a vehicle, such as an aircraft. The electrical circuit 500 includes a voltage source 502, a magnetic sensor 504, resistors 506, a first light source indicator 508 (e.g., a first LED), and a second light source indicator 510 (e.g., a second LED). The magnetic sensor 504 may be configured to detect a change in a magnetic field.

In the illustrated example, a magnet may be attached to a life vest and the magnetic sensor 504 may sense or detect the proximity of the magnet to the magnetic sensor 504. When the magnet on the life vest is in close proximity to the magnetic sensor 504, a contact 511 of the magnetic sensor 504 may contact a terminal 512 to activate the first light source indicator 508. The first light source indicator 508 may indicate that the life vest is detected and is properly stowed. The first light source indicator 508 may display a green color.

When the magnet attached to the life vest moves away from the magnetic sensor 504 by a predetermined distance, the contact 511 of the magnetic sensor 504 contacts a terminal 514 to activate the second light source indicator 510. The second light source indicator 510 may indicate that the life vest is not detected. The second light source indicator 510 may display a red color. The illumination of the second light source indicator 510 may indicate that the life vest is not detected or present. For example, the illumination of the second light source indicator 510 can alert crew members that a life vest disposed underneath a passenger seat may be tampered with or removed. As a result, the crew members can take action to remedy the situation. The electrical circuit 500 may also include an alarm 516 to alert crew member that a life vest may be tampered with or removed. A switch 518 of the electrical circuit 500 may be used to deactivate the alarm.

FIG. 6 illustrates a schematic diagram of an electric circuit 600 for detecting or monitoring the presence of a life vest disposed underneath a passenger seat of a vehicle, such as an aircraft. The electrical circuit 600 includes a voltage source 602, a limit switch sensor 604, resistors 606, a first light source indicator 608 (e.g., a first LED), and a second light source indicator 610 (e.g., a second LED). The limit switch sensor 604 is configured to detect or sense whether the limit switch sensor 604 engages or contacts the life vest. For example, the limit switch sensor 604 may include an actuator that causes a switch 611 to move between a first position or state and a second position or state. The actuator of the limit switch sensor 604 may have a depressed position and an extended position.

When a life vest contacts or engages the actuator of the limit switch sensor 604, the actuator may be in the depressed position to cause the switch 611 to move to the first position or state. In the first position, the switch 611 of the limit switch sensor 604 may contact a terminal 612 to illuminate the first light source indicator 608 (e.g., a first LED) to a color. The first light source indicator 608 may display a green color. The illumination of the first light source indicator 608 may indicate that the life vest is detected and is properly stowed.

When the life vest is separated from the limit switch sensor 604, the actuator will extend into a non-depressed position and cause the switch 611 to move to the second position or state. In the second position, the switch 611 of the limit switch sensor 604 may contact a terminal 614 to illuminate a second light source indicator 610 to a color. The second light source indicator 610 (e.g., a second LED) may display a red color. The illumination of the second light source indicator 610 may indicate that the life vest is not detected. For example, the activation of the second light source indicator 610 can alert crewmembers that a life vest underneath the seat may be removed or tampered with. As a result, the crewmembers can take action to remedy the situation. The electrical circuit 600 may also include an alarm 616 to alert crew member that a life vest may be tampered with or removed. A switch 618 of the electrical circuit 600 may be used to deactivate the alarm.

FIG. 7 shows a schematic diagram of an electrical circuit 700 for detecting or monitoring the presence of a life vest in a vehicle, such as an aircraft. The electrical circuit 700 includes a voltage source 702, a proximity sensor 704, resistors 706, a relay 708, a diode 710, an alarm 712, a first light source indicator 714 (e.g., a first LED), and a second light source indicator 716 (e.g., a second LED). The proximity sensor 704 may sense or detect the proximity of the life vest relative to the proximity sensor 704.

When the proximity sensor 704 is in close proximity to the life vest, a contact 717 of the relay 708 may contact a terminal 718 to illuminate the first light source indicator 714. The illumination of the first light source indicator 714 may indicate that the life vest is detected and is properly stowed. The first light source indicator 714 may display a green color. When the life vest is moved away from the proximity sensor 704 by a predetermined distance, the contact 717 of the relay 708 may contact a terminal 720 to illuminate the second light source indicator 716. The illumination of the second light source indicator 716 may indicate that the life vest is not detected. For example, the second light source indicator 716 may display a red color. Further, the alarm 712 may be activated to alert crew members that a life vest has been tampered with or has been removed from underneath the passenger seat. As a result, the crew members can take action to remedy the situation.

FIG. 8 is a flow chart representative of an example method 800 for detecting or monitoring the presence of a life vest disposed underneath a passenger seat of a vehicle, such as an aircraft. The method can be implemented using one or more of the structures depicted in the figures described above, and thus is described with reference to FIGS. 2-7; however, it will be appreciated that the method is not limited to any particular structure or use unless expressly stated herein. It will be appreciated that while the method is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been depicted for simplicity, while other illustrated acts or events can be removed or modified.

At block 802, the method involves providing a sensor for detecting a life vest. A system may be configured to detect or monitor the presence of a life vest disposed underneath a passenger seat of a vehicle. The system may include a sensor configured to detect or sense the life vest. The sensor may be any type of sensor. For example, the sensor may include a magnetic sensor, a pressure sensor, a limit switch sensor, a capacitive sensor, an eddy-current sensor, an inductive sensor, an optical sensor, or another suitable sensor.

At block 804, the method involves outputting a first signal when the sensor detects the life vest and, at block 806, the method involves outputting a second signal when the sensor fails to detect the life vest. The sensor may be configured to output a first signal when the sensor detects the presence of the life vest and may output a second signal when the sensor fails to detect the life vest. The sensor may have a switch configured to be moveable between a first position or state and a second position or state. The switch may be in the first position when the sensor detects the presence of the life vest. In the first position, the switch may enable a voltage to be applied to a first circuit path. Upon the removal of or tampering with the life vest, the sensor may fail to detect the presence of the life vest and the switch may move from the first position to the second position. In the second position, the switch may enable a voltage to be applied to a second circuit path.

At block 808, the method involves activating a first colored light source in response to the first signal and, at block 810, the method involves activating a second colored light source in response to the second signal. When the sensor detects the life vest, the sensor may cause a first light source to be illuminated. The first light source may display a green color. When the life vest is not detected by the sensor, the sensor may cause a second light source to be illuminated. The second light source indicator may display a red color.

The method also involves generating a visual or audible alarm when a life vest is not detected. For example, a console unit or monitoring unit (e.g., console unit 214A of FIG. 3 or monitoring unit 400 of FIG. 4) may provide an alarm or notifications in real-time when a life vest has been tampered with or removed from underneath a passenger seat. Such alarms and notifications may prompt crew members (e.g., flight attendants) to investigate and perform an inspection when a life vest has been tampered with or removed from its designation storage location by a passenger, preventing theft and/or to assist to in making sure that the life vest is returned to its properly stowed position or replaced.

Further, when a life vest expires, the method may include providing an alarm. For example, the console unit or monitoring unit may issue an audio alert or other notice so that a crew member can replace the life vest immediately. In some examples, the monitoring unit may display information associated with the life vest, such as a seat number, an expiration status or date, or a detection or installation status associated with the life vest. The alarm may be silenced or overridden in the event of an emergency. For example, the alarm may be deactivated by a switching device.

Various implementations of the present teachings thus provide embodiments that relate to systems, methods, and apparatus for detecting or monitoring the presence of objects or articles, such as life vests, stored on an aircraft. The embodiments can automatically and continuously monitor or detect the presence of the life vests stored on a vehicle, such as an aircraft. The embodiments can ensure compliance with airline safety regulations by providing verification that the life vests are present in their proper designated locations.

The embodiments can reduce the number of manual inspections involving life vests, decrease labor costs of the inspections, and reduce the time to complete inspections. Further, the embodiments may reduce the potential for human error associated with the manual inspections involving life vests. For example, the embodiments can be configured to detect whether a life vest is present under a passenger seat or in an overhead storage compartment. In addition, in the aircraft industry, the embodiments may reduce the number of flights that are delayed for inspections involving life vests.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The embodiments described herein can be realized in hardware, software, or a combination of hardware and software. For example, the embodiments can be realized in a centralized fashion in at least one computer system or in a distributed fashion where different elements are spread across interconnected computer systems. Any kind of computer system or other apparatus adapted for carrying out the methods described herein can be employed. Further, the embodiments described herein can be embedded in a computer program product, which includes all the features enabling the implementation of the operations described herein and which, when loaded in a computer system, can carry out these operations.

The flowcharts and block diagrams described herein illustrate the architecture, functionality, and operation of possible implementations of systems, methods, and apparatus according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While apparatus has been described with reference to certain examples, it will be understood by those skilled in the art that various changes can be made and equivalents can be substituted without departing from the scope of the claims. Therefore, it is intended that the present apparatus not be limited to the particular examples disclosed, but that the disclosed apparatus include all embodiments falling within the scope of the appended claims.

What is claimed is:

1. A system for monitoring a presence of a life vest underneath a seat on an aircraft comprising:
a container attached underneath the seat and configured to contain the life vest;
a sensor positioned on the container to contact the life vest, the sensor configured to output a first signal when the sensor detects contact with the life vest and to output a second signal when the sensor fails to detect contact with the life vest;
a console unit mounted above the seat and wired to the sensor, the console unit comprising:
vents, a reading light, and an attendant request button;
a first visual indicator in wired communication with the sensor, wherein the first visual indicator is activated based on the first signal;
a second visual indicator in wired communication with the sensor, wherein the second visual indicator is activated based on the second signal;
a monitoring unit positioned in a crew area of the aircraft away from the seat and configured to receive signals from the sensor, the monitoring unit comprising:
a display screen;
a graphical user interface that displays a time when the life vest is removed from the seat:
wherein one of the first visual indicator and the second visual indicator is configured to indicate an expiration status of the life vest; and
wherein the expiration status of the life vest is determined without the sensor;
wherein the monitoring unit generates reports comprising a list of all of the life vests detected on the aircraft and a list of the seats on the aircraft where a life vest is not detected.

2. The system of claim 1, further comprising a housing comprises an enclosure for holding the life vest, and wherein the sensor is coupled to the enclosure.

3. The system of claim 2, wherein the housing is mounted to a bottom of a seat of the aircraft and elevated above a floor of the aircraft.

4. The system of claim 1, wherein the first signal is outputted on a first output of the sensor, and wherein the second signal is outputted on a second output of the sensor.

5. The system of claim 1, wherein the sensor includes a switch movable between a first position and a second position, wherein the switch is in the first position when the sensor detects the life vest, and wherein the switch is in the second position when the sensor fails to detect the life vest.

6. The system of claim 1, wherein the sensor detects the life vest when the life vest is within a first distance from the sensor.

7. The system of claim 1, wherein the sensor is configured to provide the first and second signals based on a proximity of the life vest relative to the sensor.

8. The system of claim 1, wherein the sensor includes a switch actuator extending from the sensor, and wherein the sensor detects the life vest when said switch actuator is depressed against the life vest.

9. The system of claim 1, wherein the sensor includes a first portion and a second portion, wherein the first portion is configured to be attached to the life vest, wherein the second portion is operatively coupled to the first portion, and wherein the life vest is detected based on a proximity of the first portion relative to the second portion.

10. The system of claim 1, wherein the sensor is configured to detect the life vest based on a magnetic field generated by a magnet attached to the life vest.

11. The system of claim 1, wherein the sensor comprises a magnetic sensor, a limit switch sensor, a proximity sensor, or a motion sensor.

12. The system of claim 1, wherein the first visual indicator comprises a first light source configured to illuminate with a first color, and wherein the second visual indicator comprises a second light source configured to illuminate with a second color.

13. The system of claim 12, wherein the first light source is configured to be illuminated when the life vest is positioned in a stowed or installed state, and wherein the second light source is configured to be illuminated when the life vest has been removed or tampered with.

14. The system of claim 12, further comprising a relay device configured to activate the first visual indicator or the second visual indicator based on the first signal or the second signal of the sensor.

15. The system of claim 1, further comprising an alarm, wherein the alarm is configured to alert an authorized person that the life vest has been removed or tampered with.

16. The system of claim 15, wherein the alarm is activated based on an output of the second visual indicator.

17. The system of claim 1, further comprising a tag, wherein the tag is coupled to the life vest, wherein the sensor is configured to wirelessly receive information from the tag, and wherein the information includes a seat number, the expiration status, or a stowed or installation status of the life vest.

18. The system of claim 1, wherein the graphical user interface includes a representation of a flight deck, the crew area, and a passenger compartment of the aircraft.

19. The system of claim 18, wherein the graphical user interface displays a stowed status of each of the life vests.

20. The system of claim 18, wherein the graphical user interface displays a tamper status of each of the life vests.

* * * * *